US011940746B2

(12) United States Patent
Sekigawa

(10) Patent No.: US 11,940,746 B2
(45) Date of Patent: Mar. 26, 2024

(54) IMAGE FORMING APPARATUS AND MEASUREMENT APPARATUS

(71) Applicant: CANON KABUSHIKI KAISHA, Tokyo (JP)

(72) Inventor: Akito Sekigawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/060,282

(22) Filed: Nov. 30, 2022

(65) Prior Publication Data

US 2023/0176508 A1 Jun. 8, 2023

(30) Foreign Application Priority Data

Dec. 8, 2021 (JP) ................................ 2021-199627

(51) Int. Cl.
*G03G 15/00* (2006.01)
*G03G 15/20* (2006.01)

(52) U.S. Cl.
CPC ..... *G03G 15/2028* (2013.01); *G03G 15/5062* (2013.01); *G03G 2215/00063* (2013.01); *G03G 2215/00679* (2013.01)

(58) Field of Classification Search
CPC ........... G03G 15/2028; G03G 15/5062; G03G 2215/00063; G03G 2215/00067; G03G 2215/00679
See application file for complete search history.

(56) References Cited

U.S. PATENT DOCUMENTS

2013/0243451 A1 9/2013 Hirota et al.
2014/0185047 A1 7/2014 Tajima et al.
2014/0185114 A1* 7/2014 Takemura .......... G03G 15/5062 358/504
2022/0281227 A1* 9/2022 Shigihara ........... G03G 15/5062

* cited by examiner

*Primary Examiner* — Sophia S Chen
(74) *Attorney, Agent, or Firm* — Canon U.S.A., Inc. I.P. Division

(57) ABSTRACT

An image forming apparatus includes a conveyance guide, a measurement unit, an opposing member, and a holding member. The conveyance guide has an opening and forms a conveyance path through which a sheet with an image formed on the sheet is conveyed. The measurement unit measures, through the opening, a color of the image on the sheet being conveyed through the conveyance path. The opposing member opposes the measurement unit at a measurement position of the measurement unit. The holding member holds the opposing member so that the opposing member is movable between a first position where the opposing member presses the sheet against the opening and a second position where the opposing member is separated from the opening as compared with the first position. The holding member includes an abutment portion that abuts against the conveyance guide in a state where the opposing member is at the first position.

14 Claims, 14 Drawing Sheets

FIG.4

Header:

size: 270176 bytes
CMMType: 'appl'
version: 0x02002001
profileClose: 'prtr'
dataColorSpace: 'CMYK'
interchangeSpace: 'XYZ'
CreationDate: 3.4.1996, 19:46:14
CS23ignature: 'acsp' prim.platform: 'APPL'
flags: 0x00000000
deviceManufacturer: 'EF1'
deviceModel: 0
deviceAttributes: 0x00000000, 0x00000000
renderingIntent: 2
white XYZ: X = 0.9642, V = 1.0000, Z = 0.8249

Tag Table: <10 elements, double-click to inspect>

| Ind | Signet. | elementoffset | size |
|---|---|---|---|
| 0 | 'A2B0' | 252 = 0x000000FC | 43002 |
| 1 | 'B2A0' | 43256 = 0x0000A8F8 | 42940 |
| 2 | 'A2B1' | 86196 = 0x00015084 | 43002 |
| 3 | 'B2A1' | 129200 = 0x0001F880 | 42940 |
| 4 | 'A2B2' | 172140 = 0x0002A06C | 43002 |
| 5 | 'B2A2' | 215144 = 0x00034868 | 42940 |
| 6 | 'gamt' | 258084 = 0x0003F024 | 11925 |
| 7 | 'desc' | 270012 = 0x00041EBC | 125 |
| 8 | 'cprt' | 270140 = 0x00041F3C | 14 |
| 9 | 'wtpt' | 270156 = 0x00041F4C | 20 |
| | | | |
| | | | |
| | | | |
| | | | |
| | | | |
| | | | |

P
602
135a
200
α

601
601a
602
135b
502
200
135a
501

601
601a
602
135b
502
135
200
135a
501

IMAGE FORMING APPARATUS AND MEASUREMENT APPARATUS

BACKGROUND

Field

The present disclosure relates to an image forming apparatus that forms an image on a sheet and a measurement apparatus that measures a color of the image on the sheet.

Description of the Related Art

In recent years, an image forming apparatus used for on-demand printing has been required to maintain high image quality. Examples of an index of the image quality include granularity, in-plane uniformity, character quality, color reproducibility (including color stability), and geometric characteristics (including front/rear registration). Further, if a time taken to adjust and check the image quality is increased, an operation rate of the image forming apparatus is reduced. Thus, some of such image forming apparatuses have a function of automatically adjusting an image forming condition by outputting a test image (a patch image).

United States Patent Application Publication No. 20130243451 discusses an image forming apparatus that automatically corrects an image forming condition by measuring a patch image formed on a sheet using a measurement unit. United States Patent Application Publication No. 20140185047 discusses a technique in which an opposing member provided at a position opposed to a measurement unit moves to come close to or separate from the measurement unit in order to adjust a position of a sheet to a focus position of the measurement unit.

However, when the opposing member moves to a position close to the measurement unit, the position of the opposing member is not stable in some cases. In a case where the position of the opposing member is not stable when the measurement unit reads the patch image on the sheet, a distance between the measurement unit and the sheet varies, which may deteriorate measurement accuracy of the measurement unit.

SUMMARY

The present disclosure is directed to a technique for suppressing deterioration of measurement accuracy of a measurement unit.

According to an aspect of the present disclosure, an image forming apparatus includes an image forming unit configured to form an image on a sheet, a first conveyance guide having an opening and forming a conveyance path through which the sheet with the image formed on the sheet by the image forming unit is conveyed, a second conveyance guide opposed to the first conveyance guide and forming the conveyance path together with the first conveyance guide, a measurement unit configured to measure, through the opening, a color of the image on the sheet being conveyed through the conveyance path, an opposing member opposed to the measurement unit at a measurement position of the measurement unit, and a holding member configured to hold the opposing member so that the opposing member is movable between a first position where the opposing member presses the sheet against the opening and a second position where the opposing member is separated from the opening as compared with the first position, wherein the holding member includes an abutment portion configured to abut against the first conveyance guide in a state where the opposing member is at the first position.

Further features of the present disclosure will become apparent from the following description of exemplary embodiments with reference to the attached drawings.

BRIEF DESCRIPTION OF THE DRAWINGS

FIG. 4 is a diagram of an International Color Consortium (ICC) profile.

DESCRIPTION OF THE EMBODIMENTS

An exemplary embodiment of the present disclosure will be described below with reference to the attached drawings. Dimensions, materials, shapes, and relative arrangements of components described in the exemplary embodiment can be changed as appropriate depending on a configuration of an apparatus to which the exemplary embodiment of the present disclosure is applied and various kinds of conditions, and do not intend to limit the scope of the present disclosure to the following exemplary embodiment.

<Image Forming Apparatus>

Figure 1:
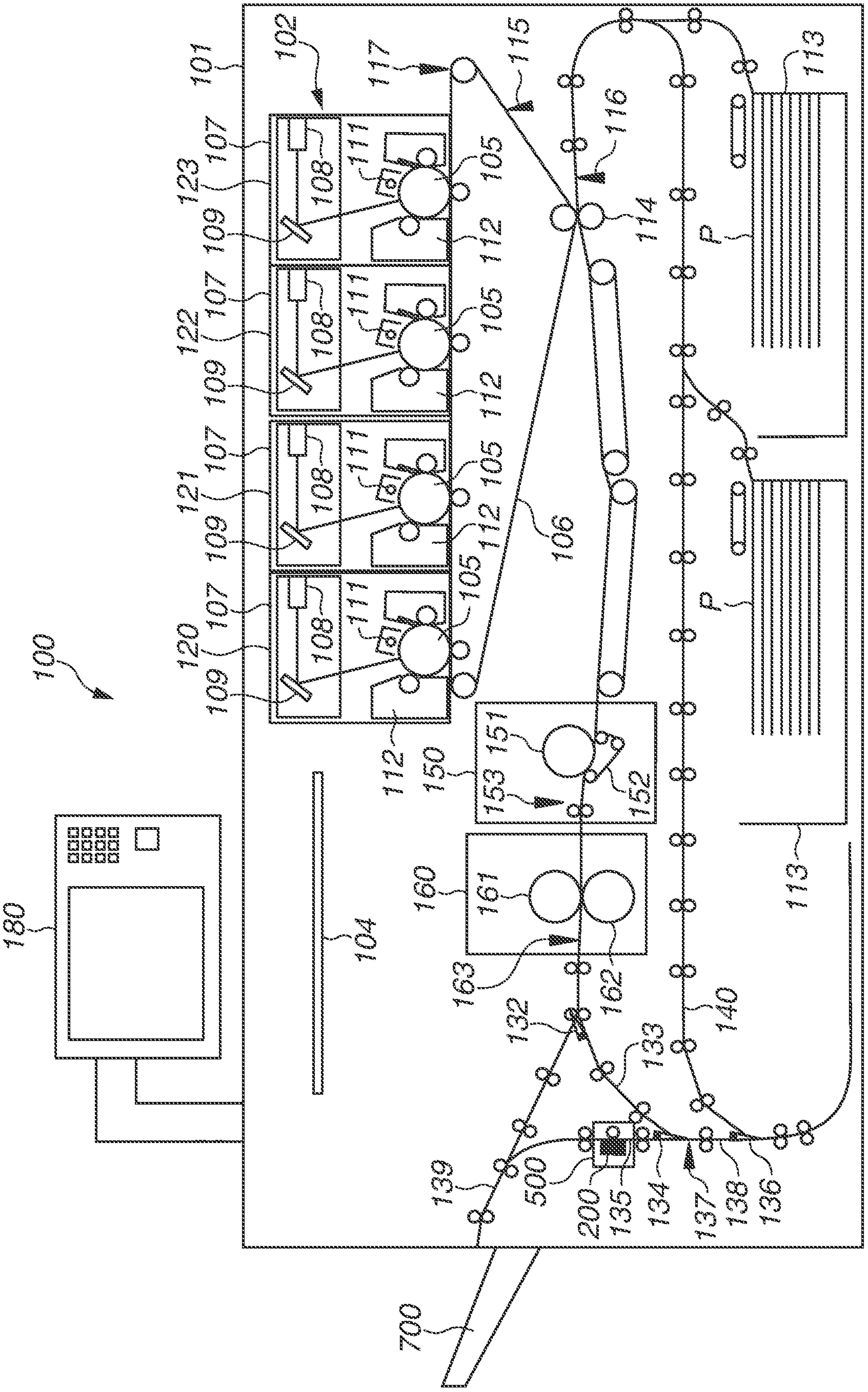
FIG. 1 is a cross-sectional view of an image forming apparatus.

First, an image forming apparatus 100 according to the present exemplary embodiment will be described. FIG. 1 is a cross-sectional view of a configuration of the image forming apparatus 100. In the present exemplary embodiment, a side of the image forming apparatus 100 on which a user performs an operation on an operation unit 180 is referred to as a front side of the image forming apparatus 100, and a side of the image forming apparatus 100 opposite to the front side is referred to as a rear side of the image forming apparatus 100. In other words, FIG. 1 illustrates the image forming apparatus 100 viewed from the front side.

As illustrated in FIG. 1, the image forming apparatus 100 includes a housing 101. The housing 101 includes mechanisms configuring an image forming unit 102 that forms an image on a sheet P, and a control board storage unit 104 storing a printer controller 103 (see FIG. 3 described below) that controls operation of the image forming apparatus 100. The image forming unit 102 according to the present exemplary embodiment includes an optical processing mechanism and a fixing processing mechanism that form an image on a recording medium using an electrophotographic process, and a feeding processing mechanism and a conveyance processing mechanism that feed and convey the sheet P serving as the recording medium. As the recording medium, paper such as plain paper and thick paper, paper subjected to surface treatment, such as coated paper and embossed paper, and a sheet material such as a plastic film and fabric are usable.

The optical processing mechanism includes stations 120 to 123 that form toner images of respective colors of yellow (Y), magenta (M), cyan (C), and black (K), and an intermediate transfer belt 106. In each of the stations 120 to 123, a primary charger 111 charges a surface of a photosensitive drum 105 that is a drum-shaped image bearing member. Then, a laser scanner unit 107 performs exposure processing on the photosensitive drum 105 based on image data. The laser scanner unit 107 includes a laser driver that turns on or off a laser beam to be emitted from a semiconductor laser 108, and guides the laser beam from the semiconductor laser 108 to the photosensitive drum 105 through a reflection mirror 109 while distributing the laser beam in a main scanning direction using a rotary polygonal mirror. As a result, an electrostatic latent image corresponding to the image data is formed on the surface of the photosensitive drum 105.

Further, a developing unit 112 internally stores a developer that contains toner, and supplies charged toner particles to the photosensitive drum 105. The toner particles attach to the surface of the photosensitive drum 105 based on surface potential distribution, whereby the electrostatic latent image borne on the photosensitive drum 105 is visualized as a toner image. The toner image borne on the photosensitive drum 105 is transferred (primarily transferred) onto the intermediate transfer belt 106 to which a voltage of polarity opposite to regular charging polarity of the toner is applied. In the case of color image formation, the toner images formed by the four stations 120 to 123 are multi-transferred onto the intermediate transfer belt 106 so as to overlap with one another, so that a full-color toner image is formed on the intermediate transfer belt 106.

The feeding processing mechanism feeds the sheets P one by one from one of storages 113 toward a transfer roller 114. Each of the storages 113 is inserted into the housing 101 of the image forming apparatus 100 so as to be drawable. The toner image borne on the intermediate transfer belt 106 serving as an intermediate transfer member is transferred (secondarily transferred) onto the sheet P by the transfer roller 114.

An image forming start position detection sensor 115 for determining a print start position in image formation, a feed timing sensor 116 for determining a feed timing of the sheet P, and a density sensor 117 are disposed around the intermediate transfer belt 106. The density sensor 117 measures density of the toner image borne on the intermediate transfer belt 106. The printer controller 103 adjusts operation conditions of the optical processing mechanism (e.g., settings for a target charging potential of the primary charger 111 and a bias voltage of the developing unit 112) based on a result of the detection by the density sensor 117.

The fixing processing mechanism includes a fixing unit 150 and a cooling unit 160. The fixing unit 150 includes a fixing roller 151 that applies heat to the sheet P, a pressure belt 152 that brings the sheet P into pressure contact with the fixing roller 151, and a post-fixing sensor 153 that detects completion of fixing processing by the fixing unit 150. Each of rollers including the fixing roller 151 is a hollow roller, and internally includes a heater. The fixing unit 150 applies heat and pressure to the toner image on the sheet P while nipping and conveying the sheet P between the fixing roller 151 and the pressure belt 152 that are a rotary member pair. As a result, the toner particles are melted and then solidified to fix the image to the sheet P.

The cooling unit 160 is disposed on a downstream side of the fixing unit 150 in a conveyance path of the sheet P. The cooling unit 160 prevents a temperature rise of the optical processing mechanism due to heat radiation from the sheet P heated by the fixing unit 150. Further, the cooling unit 160 prevents the sheet P from being curled by heat. The cooling unit 160 is configured to convey the sheet P using rollers 161 and 162 while absorbing the heat of the sheet P, and to prompt heat radiation of the rollers 161 and 162 using a fan (not illustrated). The cooling unit 160 includes a post-cooling sensor 163 that detects completion of cooling processing by the cooling unit 160.

The sheet P having passed through the cooling unit 160 is guided to one of a first conveyance path 139 and a second conveyance path 133 by a switching flap 132. The sheet P guided to the first conveyance path 139 is discharged to an outside of the image forming apparatus 100 by a discharge roller pair and is loaded on a discharge tray 700. The sheet P guided to the second conveyance path 133 is detected by a reversing sensor 137 to determine the position of the sheet P, and then a leading end and a trailing end of the sheet P in the sheet conveyance direction are switched by a switchback operation of a reversing unit 138. Thereafter, the sheet P is guided to one of a third conveyance path 135 and a reconveyance path 140 by a switching flap 136. At a branch portion between the third conveyance path 135 and the second conveyance path 133, a guide member (a return prevention valve) 134 is disposed to prevent the sheet P, which has been guided to the third conveyance path 135 by the switching flap 136 after the switchback operation, from returning to the second conveyance path 133.

A colorimetry unit 500 that measures colors of the image on the sheet P is disposed in the third conveyance path 135. The colorimetry unit 500 is a measurement apparatus according to the present exemplary embodiment. A result of the measurement by the colorimetry unit 500 is used in an operation for automatically adjusting hue of the image to be formed by the image forming unit 102. The colorimetry unit 500 includes color sensors 200 as measurement units that measure the colors of the image on the sheet P being conveyed through the third conveyance path 135. A configuration of each of the color sensors 200 and a method for adjusting the operation conditions of the image forming unit 102 using the color sensors 200 will be described below.

In the case of double-sided printing, the sheet P on which an image is formed on a first side thereof is conveyed toward the transfer roller 114 again via the reconveyance path 140 in a state where the leading end and the trailing end are reversed by the reversing unit 138. Thereafter, the sheet P on which an image is formed on a second side thereof is discharged to the outside of the image forming apparatus 100 via the first conveyance path 139 and is loaded on the discharge tray 700.

While the image forming unit 102 of the image forming apparatus 100 according to the present exemplary embodiment forms the image on the sheet P using the electrophotographic process, the image forming unit 102 may use any other image forming method such as an inkjet method.

<Color Sensor>

Figure 2:
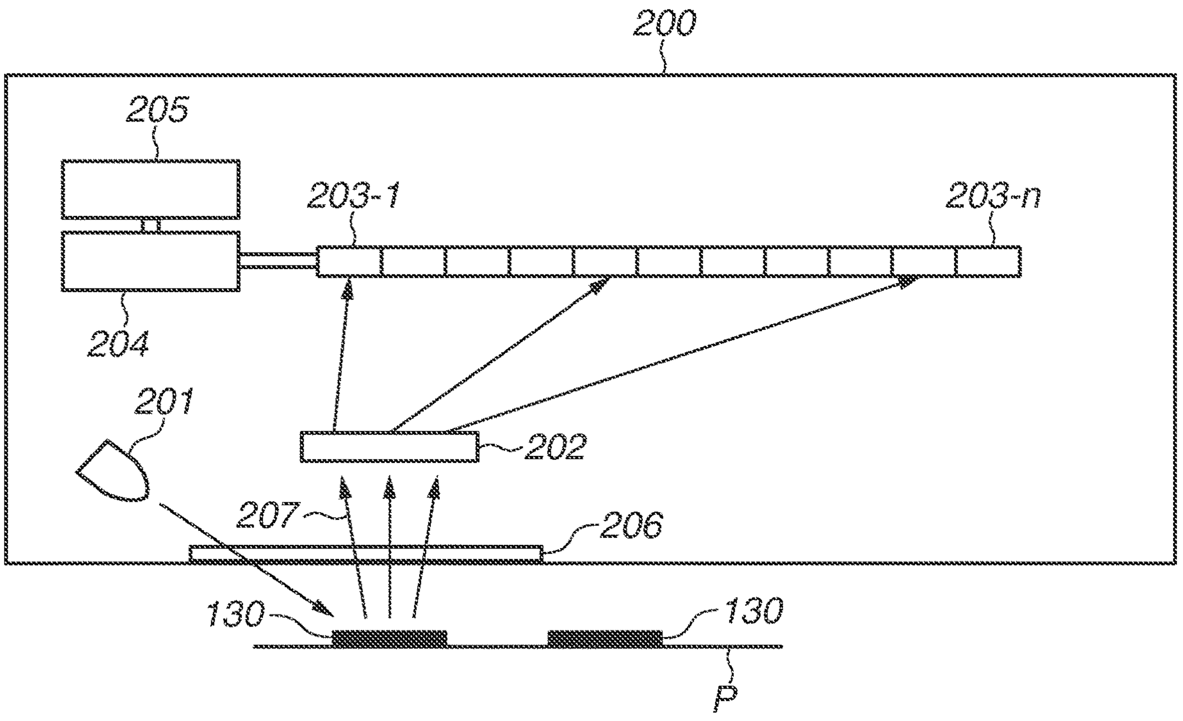
FIG. 2 is a schematic view of one of color sensors.

The image forming apparatus 100 incorporates the color sensors 200 capable of measuring spectral reflectances, into the colorimetry unit 500 provided in the third conveyance path 135. FIG. 2 illustrates a schematic configuration of each of the color sensors 200.

Each of the color sensors 200 includes a white light-emitting diode (LED) 201 as a light source, complementary metal oxide semiconductor (CMOS) sensors 203 (203-1 to **203-*n*) that detect intensity of light, and an optical system that guides the light to the CMOS sensors 203. The white LED 201 irradiates color patches (or a patch image) 130 formed on the sheet P with the light. A diffraction grating 202 decomposes reflected light 207 from the color patches 130 into wavelengths. The CMOS sensors 203 (203-1 to 203-*n*) including n pixels measure the intensity of each wavelength of the light decomposed by the diffraction grating 202. A wavelength region detectable by the CMOS sensors 203 is substantially the entire part of a visible light region. To acquire a reflection spectrum of the patch image 130 with a resolution of 10 nm over a range of 380 nm to 780 nm, the number of pixels n is desirably 41 or more. To associate the wavelength detected by each of the CMOS sensors 203 (203-1 to 203-*n***) with a pixel number, the number of pixels n is desirably 48 or 64. Alternatively, the number of pixels n may be less than 48, and the intensity of intermediate wavelengths may be calculated by interpolation.

Each of the color sensors 200 further includes a lens 206 that collects the reflected light 207 from the color patches 130 in the diffraction grating 202. The lens 206 is an incident portion at which the color sensor 200 takes in light from a measurement target. The incident portion of the color sensor 200 is not limited to a member such as the lens 206, and may be an opening for taking in light.

Detection signals of the CMOS sensors 203 are calculated by a calculation unit 204, and a result of the calculation is temporarily stored in a memory 205 and then transferred to the printer controller 103. The calculation unit 204 includes, for example, a spectral calculation unit that performs spectral calculation based on light intensity values to calculate the spectral reflectance of the color patches 130.

<System Configuration>

Figure 3:
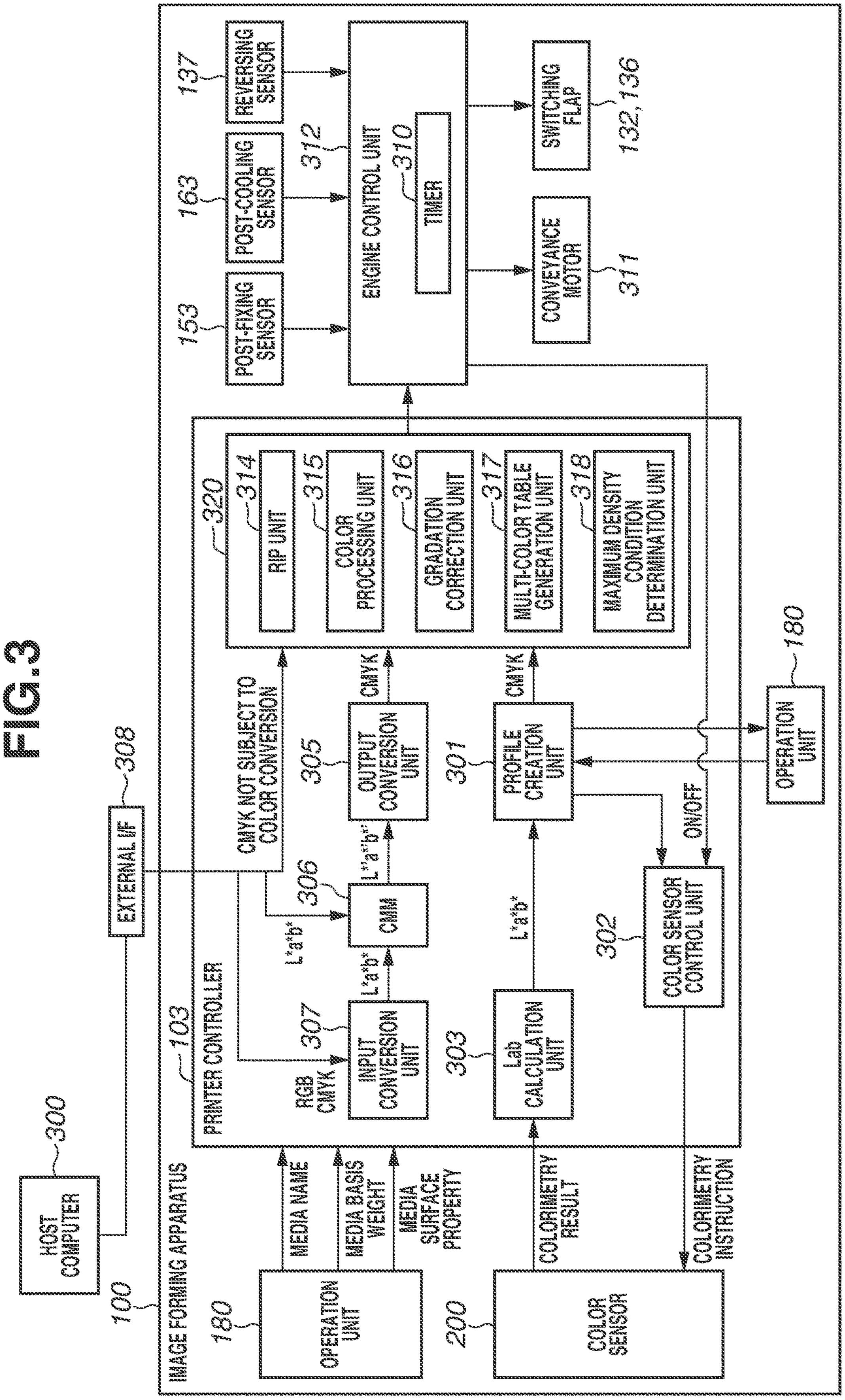
FIG. 3 is a block diagram of a control configuration of the image forming apparatus.

FIG. 3 is a block diagram of a system configuration of the image forming apparatus 100. The image forming apparatus 100 includes the printer controller 103 as a control unit that controls the operation of the image forming apparatus 100. The printer controller 103 is a control board mounted with a central processing unit (CPU) serving as a program execution unit, and a storage device. The storage device includes a volatile storage device such as a random access memory (RAM), and a nonvolatile storage device such as a read only memory (ROM). The printer controller 103 further includes functional units (e.g., a profile creation unit 301, a color management module (CMM) 306) that exert functions to be described below. These functional units may be separately implemented as independent hardware such as an application specific integrated circuit (ASIC), or may be implemented softwarewise as functional units of programs to be executed by the CPU of the printer controller 103.

The image forming apparatus 100 includes an operation unit 180 as a user interface. The operation unit 180 includes a display as a display unit that displays information to the user. The operation unit 180 further includes, as an input unit enabling the user to input an instruction and data to the image forming apparatus 100, physical keys such as a numeric keypad and a print execution button, and a touch panel function of the display. By operating the operation unit 180, the user can input information indicating sheet attributes such as a name (a media name), a basis weight (a media basis weight), and presence/absence of surface treatment (a media surface property) of the sheets P placed in the storages 113, to the printer controller 103. The input sheet attributes are registered in a sheet library stored in the storage device.

The printer controller 103 is connected to an external wired or wireless communication network via an external interface (I/F) 308, and can communicate with a host computer 300 that is an external apparatus. The printer controller 103 is also connected to a control circuit of an apparatus that is connected to the image forming apparatus 100 to form an image forming system together with the image forming apparatus 100. Examples of such an apparatus include an image reading apparatus that reads image information from a document sheet, and a sheet processing apparatus that performs processing such as binding processing and bookbinding processing on the sheets P on which images are formed by the image forming apparatus 100.

The printer controller 103 includes an image processing unit 320 that generates image information to be used for execution of an image forming operation, based on data received from the host computer 300. The image processing unit 320 includes a raster image processor (RIP) unit 314 that rasterizes an image object to a bitmap image. The image processing unit 320 further includes a color processing unit 315 that performs multi-color conversion processing, a gradation correction unit 316 that performs gradation correction of a single color, a multi-color table generation unit 317 that generates a multi-color lookup table (LUT), and a maximum density condition determination unit 318 that determines the maximum image density. These components of the image processing unit 320 are stored as program modules to be executed by the CPU of the printer controller 103, in the ROM.

In a case where an image formation execution instruction (an image formation job) including image information is input to the printer controller 103, the image processing unit 320 performs image processing on the image information (the CMYK data) subjected to color conversion using an International Color Consortium (ICC) profile (described below). In a case where a setting disabling the color conversion using the ICC profile is set in the image formation job, the image processing unit 320 performs the image processing on the image information (the CMYK data) not subject to the color conversion. The image information processed by the image processing unit 320 is transmitted to an engine control unit 312, and is used for image formation by the image forming unit 102.

The engine control unit 312 causes the image forming unit 102 to perform an image forming operation based on an instruction signal from the printer controller 103. The engine control unit 312 controls a conveyance motor 311 and the switching flaps 132 and 136 based on detection signals of the post-fixing sensor 153, the post-cooling sensor 163, and the reversing sensor 137, and a timing signal of a timer 310. The conveyance motor 311 is a motor group that drives roller members provided in the image forming apparatus 100, and rotates the roller members to convey the sheet P.

<Color Management System>

A method for performing color management by feeding back the measurement results from the color sensors 200 to the image forming apparatus 100 will be described. In the present exemplary embodiment, the ICC profile that has recently been accepted by a market as a profile achieving excellent color reproducibility is assumed to be used. Alternatively, in place of the ICC profile, any other color management system may be adopted.

Figure 5:
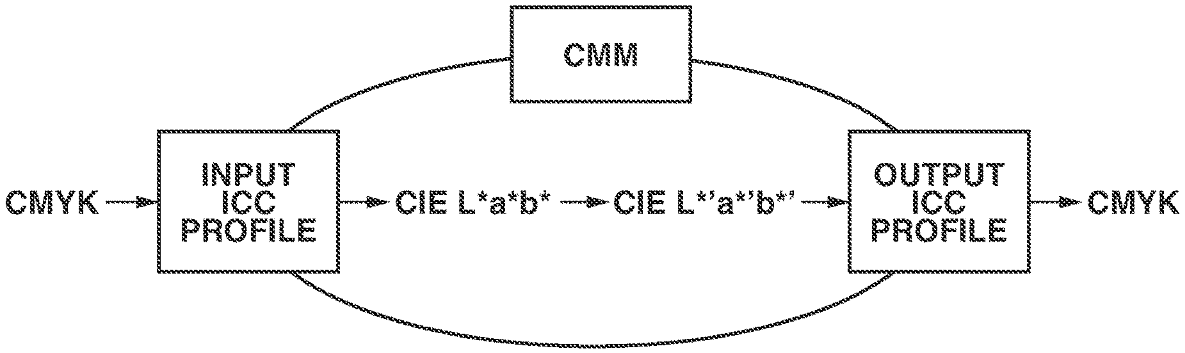
FIG. 5 is a schematic diagram of a color management environment.

FIG. 5 is a conceptual diagram illustrating color management by the CMM 306. Image data input to the image forming apparatus 100 may not necessarily use color representation in an L*a*b* color space, and may be represented in any of various data formats (color systems) such as RGB, CMYK, CIE, and XYZ.

Further, even among the image data having a common data format, perceptive colors of an original image to be reproduced by the image forming apparatus 100 may be different depending on characteristics of an input device (e.g., depending on a monitor's gamma value and a color temperature setting).

Thus, the CMM 306 converts the input image data into L*a*b* data represented by a device-independent color space (a CIE L*a*b* color space in the present exemplary embodiment) once. Then, the CMM 306 generates an instruction (CMYK signals) for instructing the image forming unit 102 to perform image formation, from L*'a*'b*' data obtained by applying an appropriate correction to the L*a*b* data. At this time, an input ICC profile is used to convert the color system of the input device into the L*a*b* color space. Further, an output ICC profile is used to convert the L*a*b* color space into a color space (a space of possible values of the CMYK signals) used by the image forming unit 102. While in the present exemplary embodiment, the CIE L*a*b* color space is adopted as the device-independent color space, any other color space (e.g., a CIE1931 XYZ color space) may be adopted in place of the CIE L*a*b* color space.

The CMYK signals designate an exposure level of the laser scanner unit 107 in each of the stations 120 to 123 for yellow, magenta, cyan, and black. In other words, a value of the CMYK signals corresponds to a toner density level for each pixel of a single-color image to be formed by each of the stations 120 to 123. The CMYK signals are transmitted from the printer controller 103 to the engine control unit 312, and then input as video signals to the laser scanner units 107.

<Profile Update Using Color Sensors>

Since the image forming apparatus 100 according to the present exemplary embodiment includes the color sensors 200, the image forming apparatus 100 can create the own output ICC profile. The output ICC profile is a color conversion profile representing correspondence relationships between the CMYK signals for the image forming unit 102 and the colors of an image actually formed on the sheet P by the image forming unit 102.

To create the output ICC profile of the image forming apparatus 100, the image forming apparatus 100 forms the color patches 130 on the sheet P using a predetermined pattern, so that a colorimetric image pattern is formed on the sheet P. The sheet P with the image pattern formed thereon is conveyed to the third conveyance path 135, and spectral reflectances thereof are measured by the color sensors 200.

Thereafter, coordinates representing the colors of the respective patches in the device-independent color space (the L*a*b* color space defined by CIE in the present exemplary embodiment) are calculated from the spectral reflectances measured by the color sensors 200. For example, the coordinates in the L*a*b* color space can be calculated from the spectral reflectances according to a procedure complying with International Organization for Standardization (ISO) 13655 as described below.

<Profile Creation Processing>

Next, ICC profile creation processing by the image forming apparatus 100 will be described in detail. The profile creation processing can be performed at any timing in response to an explicit instruction issued by the user operating the operation unit 180. For example, in a case where a customer engineer performs parts replacement, the profile creation processing is performed before execution of an image formation job in which high color reproducibility is to be achieved, and also in a case where the user desires to know the hue of a final output at a design concept stage, the profile creation processing is performed.

When the operation to create the ICC profile is performed on the operation unit 180, a signal for issuing a profile creation instruction is input to the profile creation unit 301 of the printer controller 103. The profile creation unit 301 transmits the CMYK signals for outputting a test form (a CMYK color chart) with 928 patches defined by ISO 12642, to the engine control unit 312 without performing the color conversion using the output ICC profile. In other words, in the present exemplary embodiment, as the image pattern (the test image) for color management, the test form defined by ISO 12642 is adopted. In parallel with the transmission of the CMYK signals, the profile creation unit 301 transmits an instruction (a colorimetry instruction) for measuring the test form to a color sensor control unit 302. The color sensor control unit 302 causes the color sensors 200 to measure colors of the color patches 130 on the test form.

The image forming apparatus 100 performs an image forming operation based on the CMYK signals input to the engine control unit 312, to form the test form on the sheet P. The sheet P on which the test form has been formed is conveyed to the third conveyance path 135, and the colors of the test form are measured by the color sensors 200. A Lab calculation unit 303 of the printer controller 103 is notified of spectral reflectance data of each of the 928 patches subjected to the colorimetry by the color sensors 200, and converts the spectral reflectance data into L*a*b* color space data.

The profile creation unit 301 creates the output ICC profile by associating the CMYK signals transmitted to the engine control unit 312 with the results of the colorimetry by the color sensors 200. Further, the profile creation unit 301 replaces the current output ICC profile stored in the storage device with the newly created output ICC profile.

The output ICC profile has a structure, for example, as illustrated in FIG. 4, and includes a header, tags, and data of the tags. The profile creation unit 301 creates a CMYK to L*a*b* conversion table ('A2Bx' tags) based on the CMYK signals used in the output of the test form and the L*a*b* values obtained from the colorimetry results. Further, based on this conversion table, an L*a*b* to CMYK conversion table ('B2Ax' tags) is created. As tags representing the other data, a white point ('wtpt'), a tag ('gamt') describing whether a certain color is inside or outside a color gamut of hard copy output by the image forming apparatus 100, and the like are also described in the output ICC profile.

In a case where the instruction to perform the profile creation processing is input via the external I/F 308, the ICC profile created by the profile creation unit 301 may be transmitted to an external apparatus that has issued the instruction. In this case, the user can perform color conversion using an application corresponding to the ICC profile, on the external apparatus.

As an index for color matching accuracy and color stability, for example, ΔE, which represents a color difference, is defined to be an average of 4.0 in the color matching accuracy standard (IT8.7/4 (ISO 12642:1617 patches) [4.2.2]) according to ISO 12647-7. Further, in the reproducibility [4.2.3] that is a standard for stability, ΔE of each patch is defined to be less than or equal to 1.5. To satisfy the above-described specification, detection accuracy of each of the color sensors 200 is desirably less than or equal to ΔE of 1.0. ΔE is a parameter expressed by the following expression, and indicates a three-dimensional distance between two points (L1, a1, b1) and (L2, a2, b2) in the L*a*b* color space.

$$\Delta E=((L1-L2)\hat{}2+(a1-a2)\hat{}2+(b1-b2)\hat{}2)\hat{}(1/2)$$

<Color Conversion Processing>

Next, the color conversion processing to be performed on the input image data in a case where an image formation job is input as an image formation instruction to the image forming apparatus 100 will be described. In the block diagram illustrated in FIG. 3, the image data received by the printer controller 103 via the external I/F 308 is input to an input conversion unit 307. In normal color printing, the image data is often represented by standard printing CMYK signal values such as RGB values and Japan Color values.

In this case, the input conversion unit 307 performs color conversion from RGB to L*a*b* or from CMYK to L*a*b* by using the input ICC profile, thereby converting the input image data into L*a*b* data. The input ICC profile includes a one-dimensional LUT that controls a gamma of the input signals, a multi-color LUT that is called direct mapping, and a one-dimensional LUT that controls a gamma of generated conversion data.

To adjust the hue of a product, the CMM 306 applies an appropriate correction to the L*a*b* data. Examples of the correction processing include gamut conversion that corrects a mismatch between a color gamut of the input device and a color gamut reproducible by the image forming apparatus 100. Another example thereof is color conversion that adjusts a mismatch (also referred to as a color temperature setting mismatch) between a light source type on the input side and a light source type in observation of the product produced by the image forming apparatus 100. Still another example thereof is black character determination that determines a character portion in a color image and converts a color of the character portion into a color suitable for characters in order to improve readability of the characters in the product. The L*a*b* data is converted into L*'a*'b*' data by the above correction processing. Further, in a case where the image data input via the external I/F 308 is represented in the L*a*b* color space, the CMM 306 also performs the correction processing as appropriate to convert the input image data into L*'a*'b*' data.

An output conversion unit 305 converts the L*'a*'b*' data received from the CMM 306 into CMYK signals by performing color conversion from L*a*b* to CMYK based on the output ICC profile. At this time, in a case where the profile creation unit 301 updates the output ICC profile, the CMYK signals generated based on the output ICC profile before update and the CMYK signals generated based on the output ICC profile after update are different from each other even with the same L*'a*'b*' data. In other words, the output ICC profile serving as the image forming condition of the image forming apparatus 100 is changed based on the results of the measurement by the color sensors 200. While in FIG. 3, the input conversion unit 307 and the output conversion unit 305 are illustrated as units distinguished from the CMM 306, the CMM 306 is referred to as an entire module that performs color management by performing color conversion using the input profile and the output profile as illustrated in FIG. 5.

<Opposing Roller Configuration>

Figures 6A, 6B, 6C:
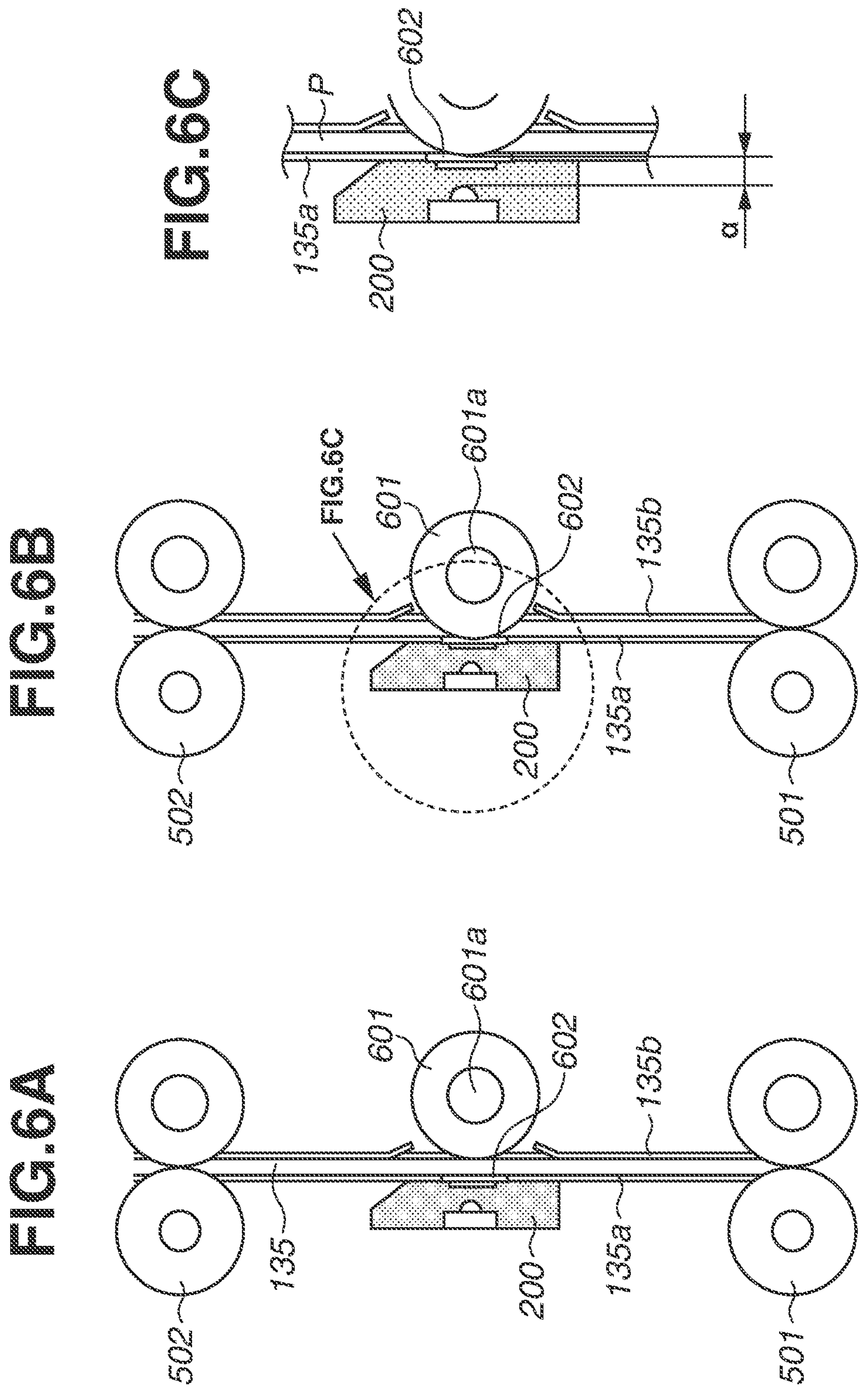
FIG. 6A is a cross-sectional view of one of opposing rollers and the corresponding color sensor in a case where the opposing rollers are at a separation position.
FIG. 6B is a cross-sectional view of one of the opposing rollers and the corresponding color sensor in a case where the opposing rollers are at an abutment position.
FIG. 6C is an enlarged view of one of openings in a case where the opposing rollers are at the abutment position.

Next, a configuration of opposing rollers 601 will be described with reference to FIG. 6A to FIG. 13. FIG. 6A illustrates one of the opposing rollers 601 and the corresponding color sensor 200 in a case where the opposing rollers 601 are at a separation position. FIG. 6B illustrates one of the opposing rollers 601 and the corresponding color sensor 200 in a case where the opposing rollers 601 are at an abutment position. FIG. 6C is an enlarged view of one of conveyance guide holes 602 in a case where the opposing rollers 601 are at the abutment position.

As illustrated in FIGS. 6A and 6B, the third conveyance path 135 is formed by a first conveyance guide 135*a* and a second conveyance guide 135*b*. The second conveyance guide 135*b* is provided at a position opposed to the first conveyance guide 135*a* and forms the third conveyance path 135 together with the first conveyance guide 135*a*. The color sensors 200 are disposed on a back side of a sheet conveyance surface (a surface opposed to the sheet P) of the first conveyance guide 135*a*. The first conveyance guide 135*a* has the conveyance guide holes 602 that are openings for the color sensors 200 to detect the color patches 130 on the sheet P. The color sensors 200 read the patch image 130 formed on the sheet P, through the conveyance guide holes 602 provided in the first conveyance guide 135*a*. The first conveyance guide 135*a* may include a plurality of members, and the openings may be formed by gaps between the plurality of members.

The third conveyance path 135 includes a first conveyance roller pair 501 disposed on an upstream side of the color sensors 200 in the conveyance direction, and a second conveyance roller pair 502 disposed on a downstream side of the color sensors 200 in the conveyance direction. The first conveyance roller pair 501 and the second conveyance roller pair 502 are conveyance members that convey the sheet P in the third conveyance path 135.

In the colorimetry unit 500, the four color sensors 200 are arranged at equal spacing in a width direction orthogonal to the conveyance direction (which is not illustrated in the present exemplary embodiment). The colorimetry unit 500 can read the patch image 130 formed on the sheet P using the four color sensors 200 while the first conveyance roller pair 501 and the second conveyance roller pair 502 convey the sheet P.

At positions opposed to measurement positions of the color sensors 200, the opposing rollers 601 are disposed as opposing members. The opposing rollers 601 are rotatably supported around an opposing roller shaft 601*a* serving as a rotary shaft. The opposing rollers 601 are respectively provided at positions corresponding to the four color sensors 200 (see FIG. 8 described below). The opposing rollers 601 are configured to move between the separation position (the position illustrated in FIG. 6A) where the opposing rollers 601 do not abut against the first conveyance guide 135*a* and the abutment position (the position illustrated in FIG. 6B) where the opposing rollers 601 abut against the first conveyance guide 135*a*. A movement mechanism of the opposing rollers 601 will be described below. The abutment position is a first position where the opposing rollers 601 come close to (are opposed to) the lenses 206 of the color sensors 200. The separation position is a second position where the opposing rollers 601 are separated from the lenses 206 of the color sensors 200 as compared with the abutment position. The opposing rollers 601 are sponge rollers made of a sponge material that is an elastic material, and can convey the sheet P by rotating while abutting against the first conveyance guide 135*a* at the abutment position.

In a normal printing job not including the measurement by the colorimetry unit 500, the opposing rollers 601 move to the separation position to prevent the sponge material from being worn. In contrast, in a colorimetry adjustment job including the measurement by the colorimetry unit 500, the opposing rollers 601 move to the abutment position to abut against the first conveyance guide 135*a*. When the sheet P is conveyed in the colorimetry adjustment job, the opposing rollers 601 urge the sheet P toward the conveyance guide holes 602 of the first conveyance guide 135*a*, and regulates the position of the sheet P so as to correspond to a focus position a of the color sensors 200. At this time, as illustrated in FIG. 6C, the opposing rollers 601 partially intrude into the respective conveyance guide holes 602.

Figure 7A:
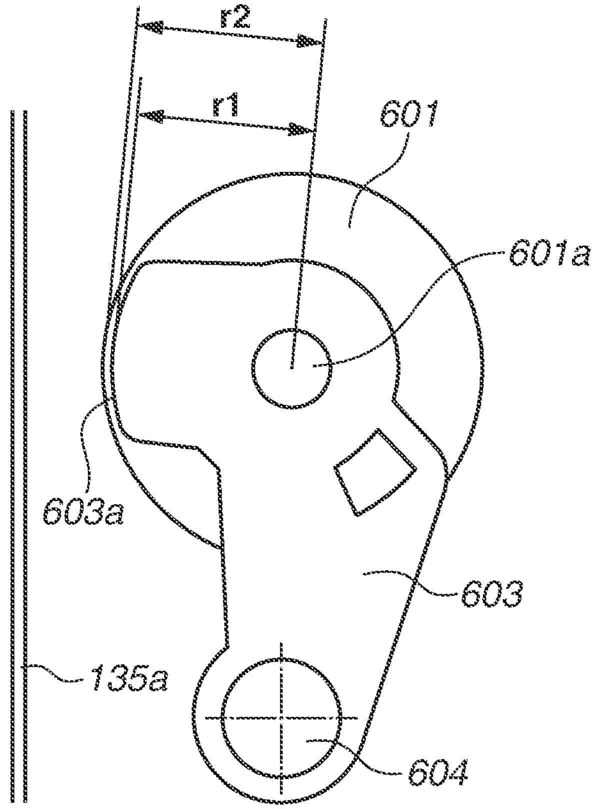
FIG. 7A is a side view of an opposing roller support portion in a case where the opposing rollers are at the separation position.
Figure 7B:
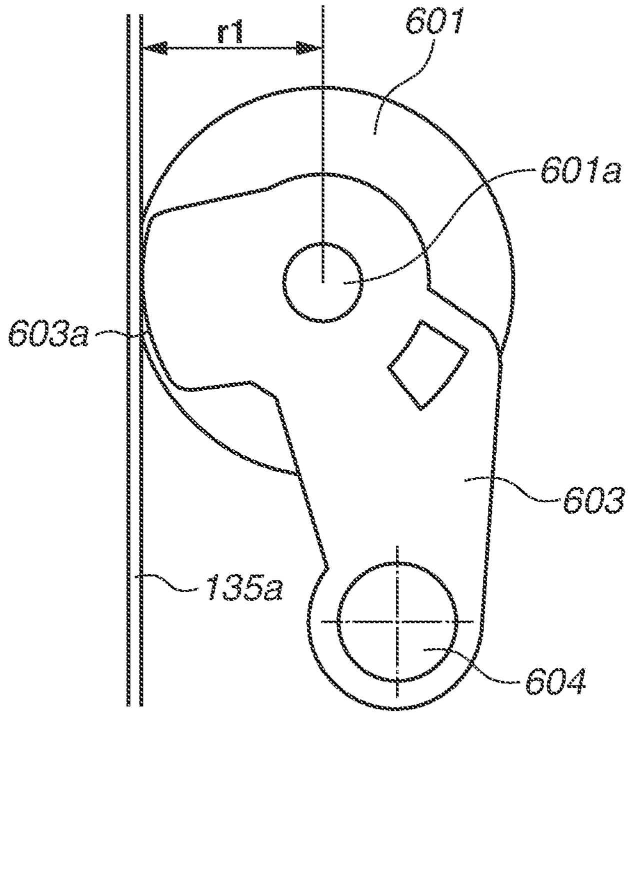
FIG. 7B is a side view of the opposing roller support portion in a case where the opposing rollers are at the abutment position.
Figure 8:
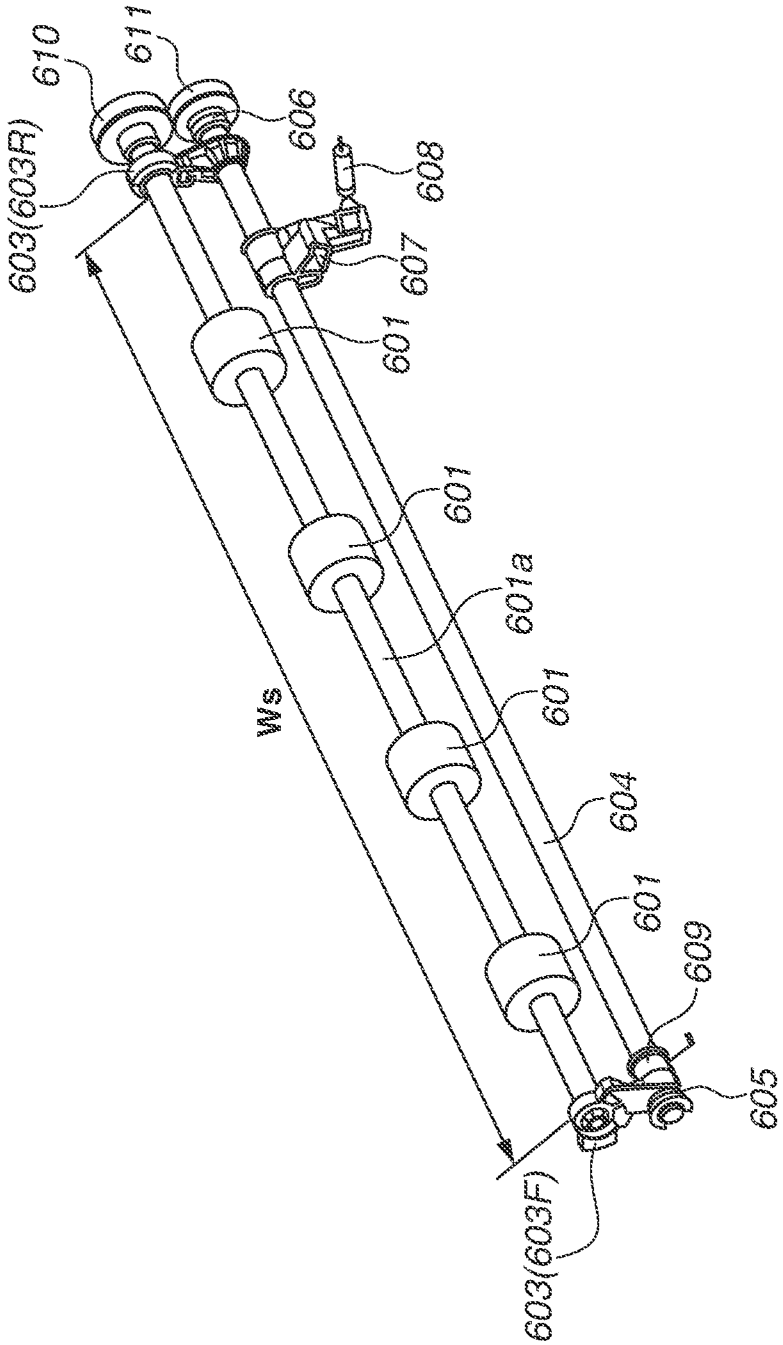
FIG. 8 is a perspective view of the opposing rollers and front and rear swing arms.

FIGS. 7A and 7B are side views of one of the opposing rollers 601 held by swing arms 603. FIG. 7A illustrates a state where the opposing rollers 601 are at the separation position. FIG. 7B illustrates a state where the opposing rollers 601 are at the abutment position. FIG. 8 is a perspective view of the opposing rollers 601 and the swing arms 603.

As illustrated in FIG. 8, the swing arms 603 serving as holding members support both ends of the opposing roller shaft 601*a*. The swing arms 603 include a front swing arm 603F (a first holding portion) that supports a front end of the opposing roller shaft 601*a*, and a rear swing arm 603R (a second holding portion) that supports a rear end of the opposing roller shaft 601*a*. The plurality of opposing rollers 601 is arranged at equal spacing in the width direction between the two swing arms 603 (the front swing arm 603F and the rear swing arm 603R).

The swing arms 603 are swingable around a swing center shaft 604 serving as a swing shaft. When the swing arms 603 swing, the opposing rollers 601 can move between the separation position and the abutment position. Each of the swing arms 603 includes an abutment portion 603*a* configured to abut against the first conveyance guide 135*a*. The abutment portions 603*a* are abutment surfaces each formed in an arc shape around the opposing roller shaft 601*a* as viewed from an axial direction of the opposing roller shaft 601*a*. As illustrated in FIG. 7A, while the opposing rollers 601 are at the separation position, the abutment portions 603*a* are separated from the first conveyance guide 135*a*. As illustrated in FIG. 7B, when the opposing rollers 601 have moved from the separation position to the abutment position, the abutment portions 603*a* abut against the first conveyance guide 135*a*.

An abutment portion radius r1 that is a distance between a center of the opposing roller shaft 601*a* and each of the abutment portions 603*a* is set to be less than an opposing roller radius r2. While in the present exemplary embodiment, a difference between the abutment portion radius r1 and the opposing roller radius r2 is 0.5 mm, the difference may be set to an appropriate value based on sponge roller hardness and a size of the image forming apparatus 100.

In a state where the opposing rollers 601 are at the abutment position, a distance from the opposing roller shaft 601*a* (the rotation center of the opposing rollers 601) to the first conveyance guide 135*a* is equal to the abutment portion radius r1. In other words, a distance from the opposing roller shaft 601*a* to the lens 206 of each of the color sensors 200 is determined by the abutment portions 603*a*.

Figure 9A:
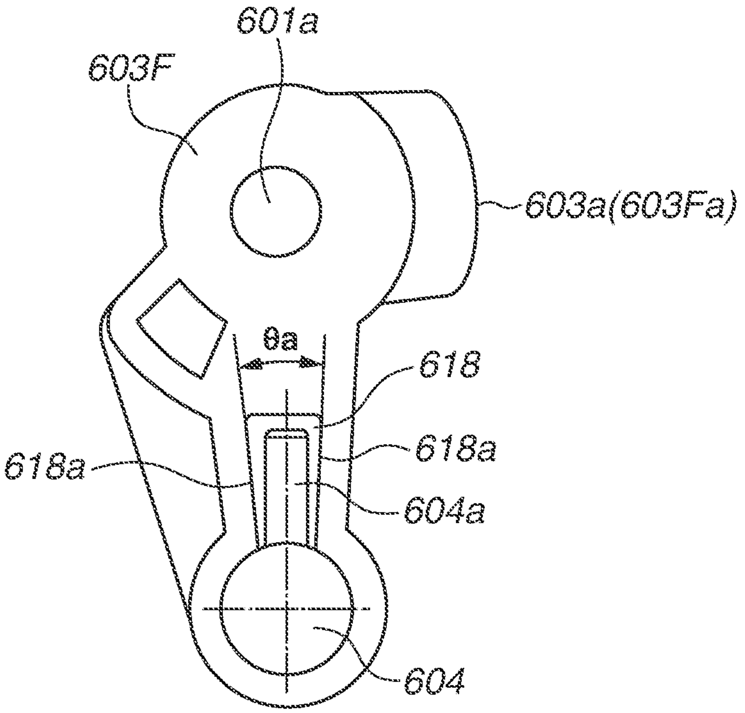
FIG. 9A is a cross-sectional view of the front swing arm.
Figure 9B:
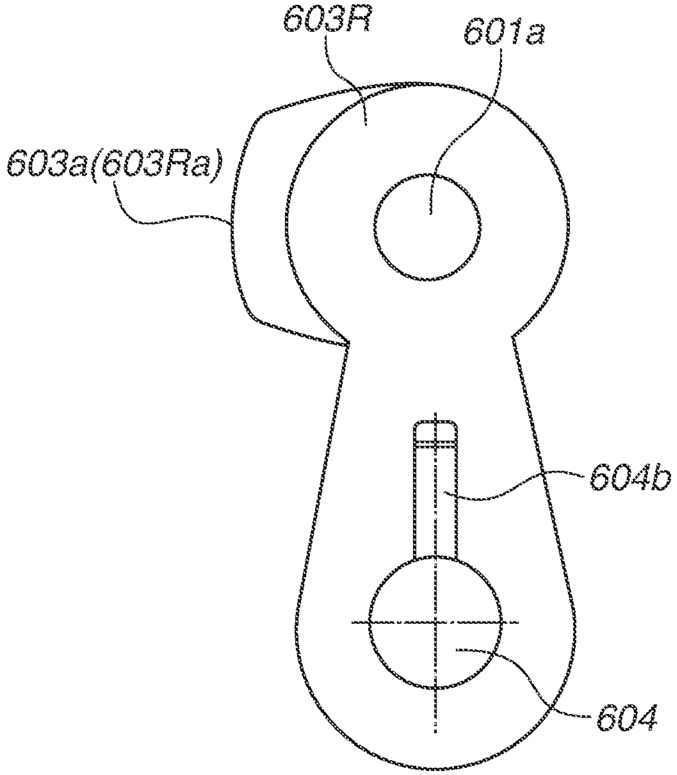
FIG. 9B is a cross-sectional view of the rear swing arm.

FIG. 9A is a cross-sectional view of the front swing arm 603F. FIG. 9B is a cross-sectional view of the rear swing arm 603R. The abutment portions 603*a* are respectively provided on the front swing arm 603F and the rear swing arm 603R, and are also referred to as a front abutment portion 603Fa and a rear abutment portion 603Ra. The front abutment portion 603Fa and the rear abutment portion 603Ra are disposed so as to abut against the first conveyance guide 135*a* outside a sheet passing area Ws (see FIG. 8) of the third conveyance path 135 where the sheet P is conveyed, in the width direction. Thus, even in a case where the sheet P of any size is conveyed, the front abutment portion 603Fa and the rear abutment portion 603Ra do not come into contact with the sheet P.

As illustrated in FIG. 9B, rotation of the rear swing arm 603R is stopped by a pin 604*b* extending from the swing center shaft 604 so that the rear swing arm 603R rotates integrally with the swing center shaft 604. In contrast, as illustrated in FIG. 9A, the front swing arm 603F has a groove 618 that is formed so that the front swing arm 603F is swingable around the swing center shaft 604 relative to a pin 604*a* extending from the swing center shaft 604, and is swingable within an angle range θa relative to the swing center shaft 604. In other words, the rear swing arm 603R is not rotatable relative to the swing center shaft 604, whereas the front swing arm 603F is rotatable relative to the swing center shaft 604. Rotation of the front swing arm 603F relative to the swing center shaft 604 is regulated within the angle range θa by walls 618*a* that are regulation portions of the groove 618.

As illustrated in FIG. 8, the swing center shaft 604 is supported by bearings 605 and 606. Further, a pressure lever 607 is fixed to the swing center shaft 604 at a position between the front swing arm 603F and the rear swing arm 603R. A pressure spring 608 serving as an urging member is provided at a front end of the pressure lever 607. When the pressure lever 607 is pulled by the pressure spring 608, the opposing rollers 601 are urged toward the first conveyance guide 135*a*. Further, a torsion coil spring 609 is disposed on the swing center shaft 604 at a position near the front swing arm 603F, and applies a force in a direction urging the front swing arm 603F toward the first conveyance guide 135*a*. Further, a conveyance driving gear 610 is fixed to the rear end of the opposing roller shaft 601*a*, and receives a driving force via an idler gear 611 that rotates around the swing center shaft 604.

Figure 10A:
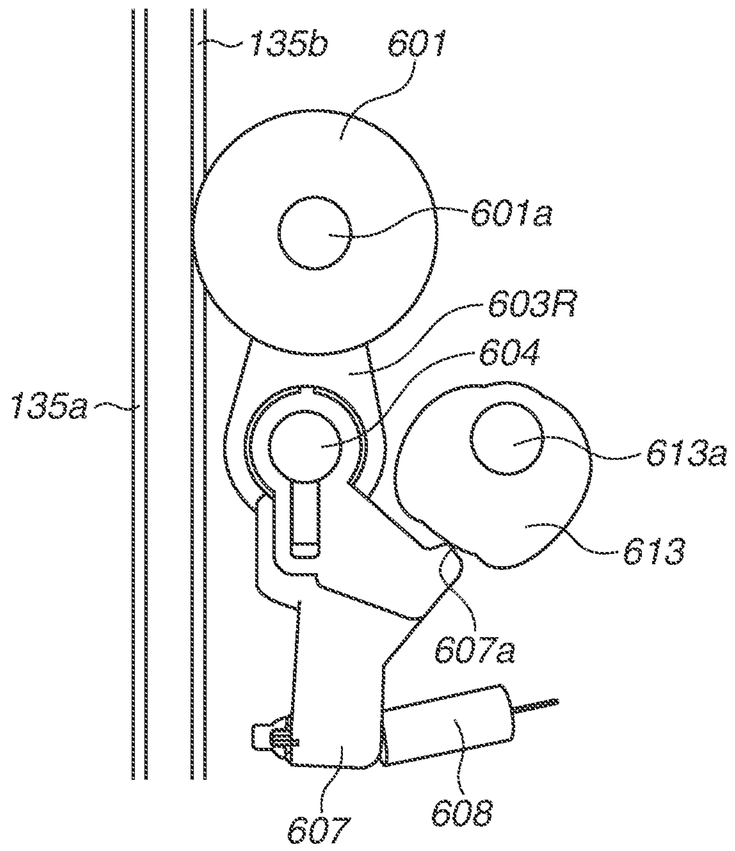
FIG. 10A is a view of a roller separation cam in a case where the opposing rollers are at the separation position.
Figure 10B:
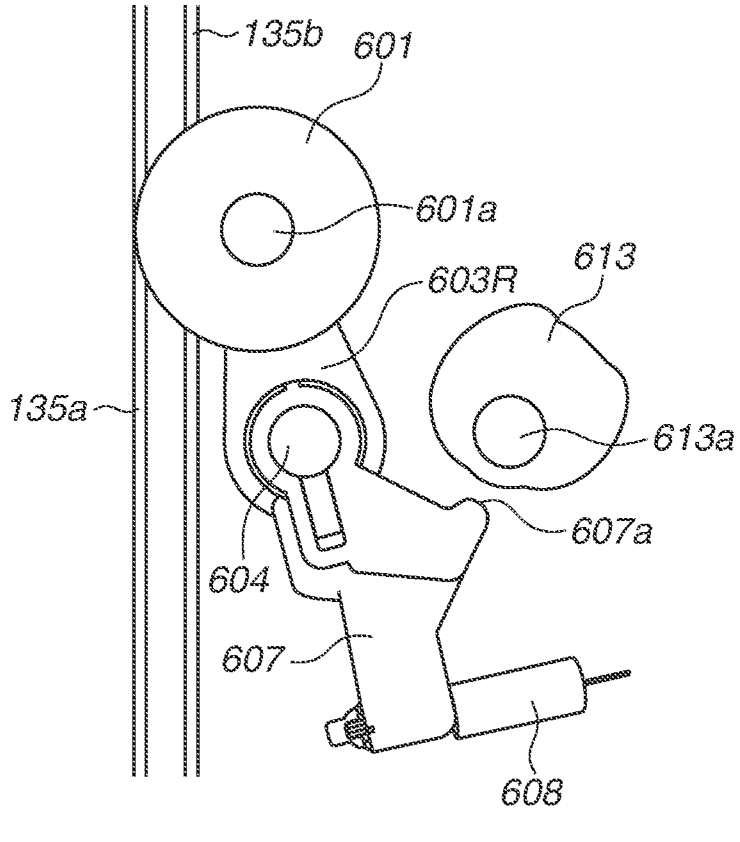
FIG. 10B is a view of the roller separation cam in a case where the opposing rollers are at the abutment position.

Next, a roller separation cam 613 that moves the opposing rollers 601 to the abutment position and to the separation position will be described with reference to FIGS. 10A and 10B. FIG. 10A illustrates the roller separation cam 613 in a state where the opposing rollers 601 are at the separation position. FIG. 10B illustrates the roller separation cam 613 in a state where the opposing rollers 601 are at the abutment position.

The roller separation cam 613 is disposed near the pressure lever 607 on a back side of a sheet conveyance surface of the second conveyance guide 135*b*, and rotates around a roller separation cam shaft 613*a*. To move the opposing rollers 601 to the separation position, the roller separation cam 613 rotates and a top dead center of the roller separation cam 613 pushes down a protrusion 607*a* of the pressure lever 607 to move the opposing rollers 601. In contrast, to move the opposing rollers 601 to the abutment position, the roller separation cam 613 rotates to a position where the roller separation cam 613 does not come into contact with the protrusion 607*a* of the pressure lever 607. As a result, the pressure lever 607 is pulled by the pressure spring 608, and the opposing rollers 601 are pressurized against the first conveyance guide 135*a*.

Figure 11:
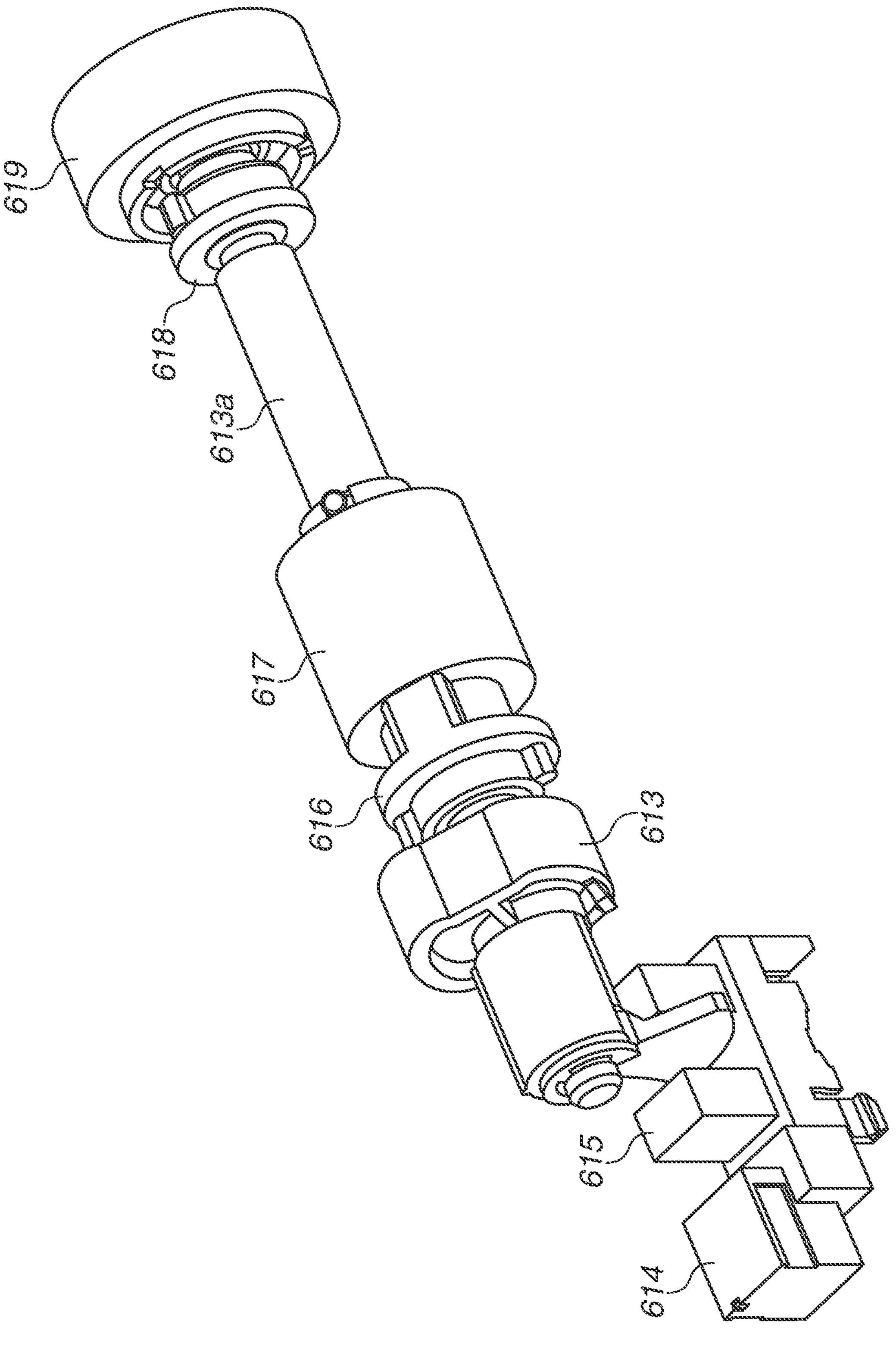
FIG. 11 is a perspective view of the roller separation cam.
Figure 12:
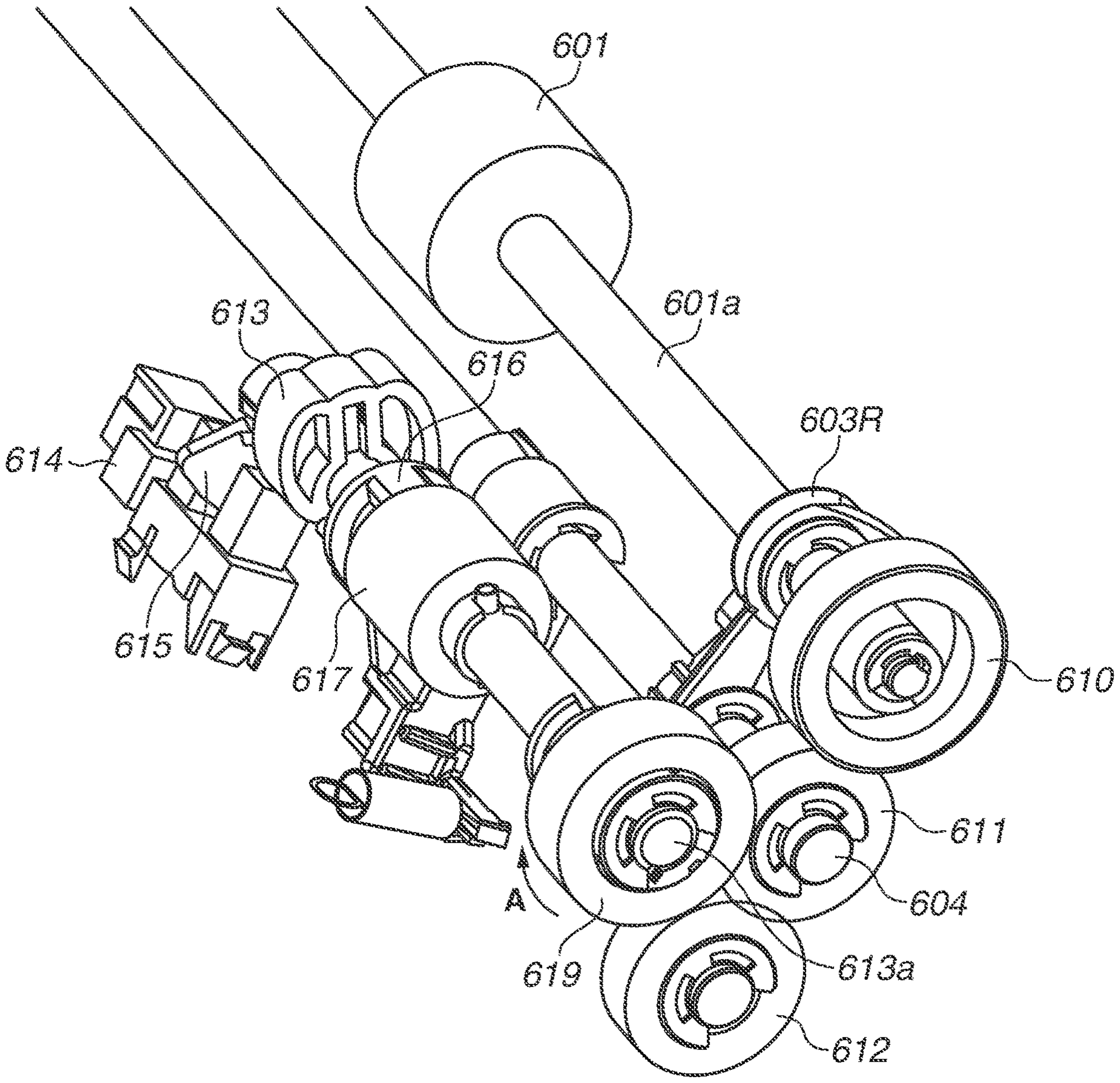
FIG. 12 is a perspective view of a driving force transmission mechanism for the roller separation cam and the opposing rollers.

Next, a driving force transmission mechanism for rotationally driving the roller separation cam 613 will be described with reference to FIGS. 11 and 12. FIG. 11 is a perspective view of the roller separation cam 613. FIG. 12 is a perspective view of the driving force transmission mechanism for the roller separation cam 613 and the opposing rollers 601. A home position (HP) sensor flag 615 for detecting a rotation position of the roller separation cam 613 is fixed to the roller separation cam shaft 613*a* so as to be rotatable integrally with the roller separation cam 613. The roller separation cam shaft 613*a* is supported by bearings 618 and 616. Further, a one-way clutch gear 619 is provided at an end of the roller separation cam shaft 613*a*.

The opposing rollers 601 are rotationally driven by receiving a driving force from a driving input gear (not illustrated) via idler gears 612 and 611 and the conveyance driving gear 610. The one-way clutch gear 619 on the roller separation cam shaft 613*a* is connected to and driven by the idler gear 611, and transmits a rotation driving force in a direction (indicated by an arrow A) opposite to a driving direction in the sheet conveyance direction, to the roller separation cam shaft 613*a*. Further, a torque limiter 617 is disposed on the roller separation cam shaft 613*a*, and generates a predetermined braking force when the roller separation cam shaft 613*a* and the roller separation cam 613 are rotationally driven. One end of the torque limiter 617 is connected to the bearing 616, and the other end is fixedly connected to the roller separation cam shaft 613*a*. Even when the driving force is not transmitted to the roller separation cam shaft 613*a*, the roller separation cam 613 can be held at a predetermined position by the torque limiter 617. Further, a separation cam HP sensor 614 that detects the HP sensor flag 615 is disposed near the HP sensor flag 615, and is used in detecting the position of the roller separation cam 613.

Figure 13:
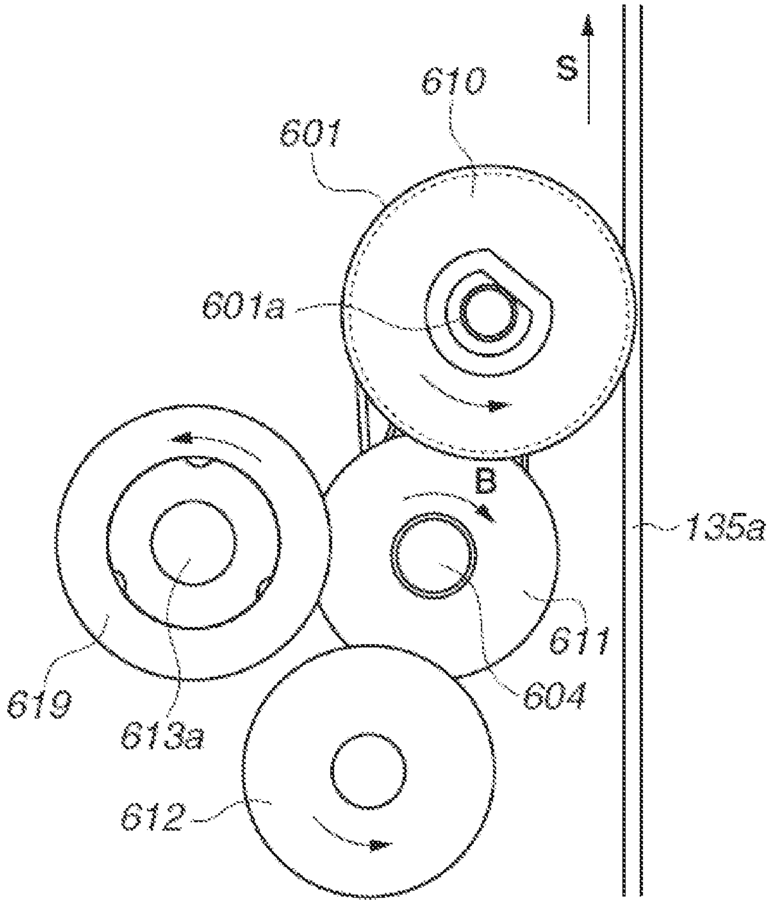
FIG. 13 is a cross-sectional view of an opposing roller drive unit.

Next, driving force transmission during the conveyance of the sheet P by the opposing rollers 601 will be described with reference to FIG. 13. FIG. 13 is a cross-sectional view of the driving force transmission mechanism for the opposing rollers 601 that is disposed near the rear swing arm 603R. The opposing rollers 601 abut against the first conveyance guide 135*a* to convey the sheet P in the direction (the conveyance direction) indicated by an arrow S. The swing center shaft 604, which is the rotation center of the swing arm 603, is located on the upstream side of the rotation center of the opposing rollers 601 in the conveyance direction. Thus, when the idler gear 611 is rotationally driven around the swing center shaft 604 in a direction indicated by an arrow B, the idler gear 611 generates a force in a direction pressing the opposing rollers 601 against the first conveyance guide 135*a* via the conveyance driving gear 610. This makes it possible to surely urge the opposing rollers 601 toward the first conveyance guide 135*a*.

<Control Procedure for Colorimetry Adjustment Job>

Figure 14:
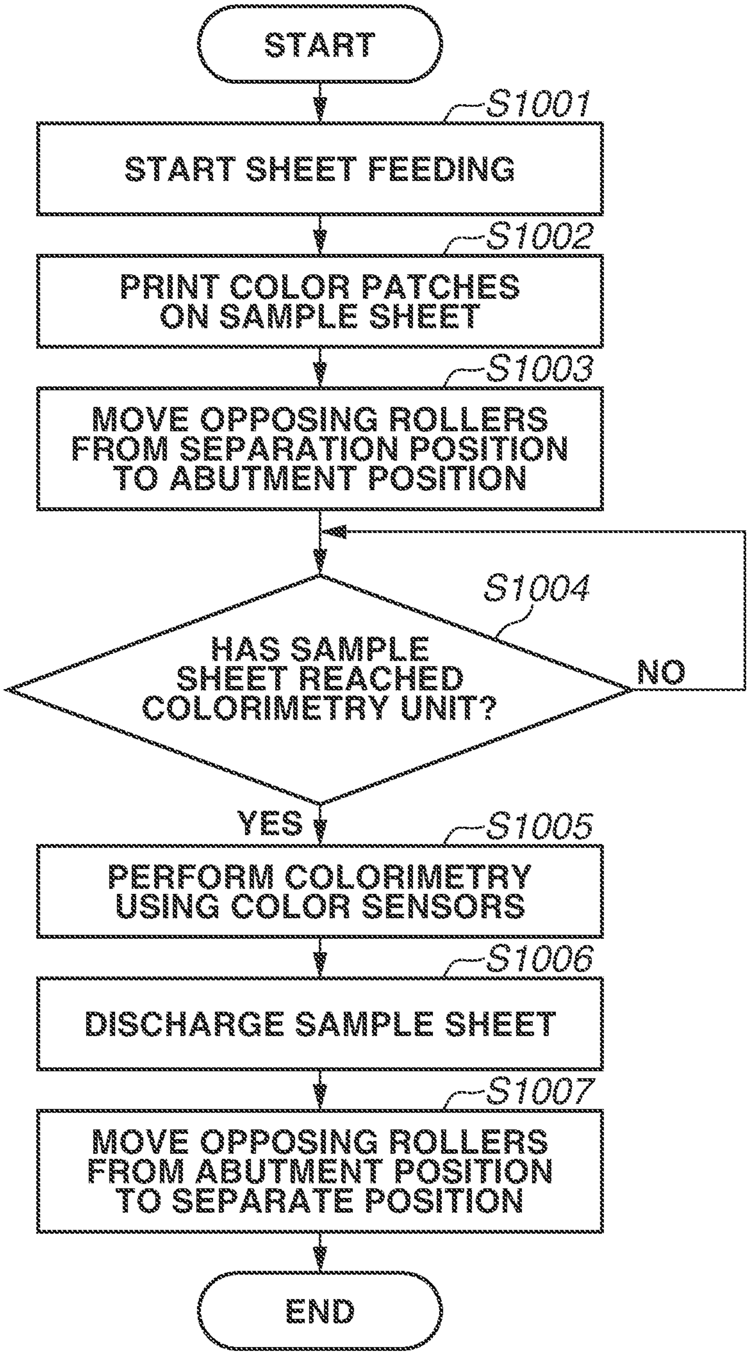
FIG. 14 is a flowchart of control for a color measurement job.

FIG. 14 is a flowchart of control performed by the printer controller 103 for the colorimetry adjustment job. When the colorimetry adjustment job is input, the printer controller 103 starts processing in the flowchart of FIG. 14. First, in step S1001, the printer controller 103 starts feeding a sample sheet on which the color patches 130 are to be printed. In step S1002, the color patches 130 are printed on the sample sheet by the image forming unit 102.

Next, in step S1003, the printer controller 103 moves the opposing rollers 601 from the separation position to the abutment position by driving the conveyance motor 311 in the direction opposite to the sheet conveyance direction so that the opposing rollers 601 abut against the first conveyance guide 135*a*.

Next, in step S1004, the printer controller 103 determines whether the sample sheet to which the color patches 130 are fixed has reached the colorimetry unit 500. In a case where the sample sheet has not reached the colorimetry unit 500 (NO in step S1004), the printer controller 103 waits until the sample sheet reaches the colorimetry unit 500. In a case where the sample sheet has reached the colorimetry unit 500 (YES in step S1004), the processing proceeds to step S1005. In step S1005, the printer controller 103 reads the color patches 130 printed on the sample sheet, using the color sensors 200.

When the colorimetry by the color sensors 200 ends, the processing proceeds to step S1006. In step S1006, the sample sheet is discharged to the discharge tray 700. In step S1007, the printer controller 103 moves the opposing rollers 601 from the abutment position to the separation position, and then the colorimetry adjustment job ends.

As described above, when the opposing rollers 601 move to the abutment position, the abutment portions 603*a* of the swing arms 603 abut against the first conveyance guide 135*a*, which directly determine the distance between the first conveyance guide 135*a* and the rotation center of the opposing rollers 601. This makes it possible to manage crushed amounts of the sponges of the opposing rollers 601 with high accuracy. As a result, a pressure abutting the opposing rollers 601 against the first conveyance guide 135*a* is also controlled to a predetermined pressure. In other words, it is possible to stabilize a dynamic position of the sheet P in document flow reading relative to the focus position a of the color sensors 200, and to improve measurement accuracy of the color sensors 200.

Further, the front swing arm 603F is swingable within the angle range θa relative to the swing center shaft 604. With such a configuration, even when there is a difference in the distance of the swing center shaft 604 to the first conveyance guide 135*a* between the rear side and the front side of the image forming apparatus 100 due to parts dimensional tolerance, the front swing arm 603F abuts against the first conveyance guide 135*a* while performing equalization. Thus, both of the front swing arm 603F and the rear swing arm 603R can constantly and stably abut against the first conveyance guide 135*a*. As a result, the crush amounts of the sponges of the opposing rollers 601 can be constantly stabilized on the front side and the rear side.

Further, when the sheet P is conveyed while being pressed against the first conveyance guide 135*a* by the opposing rollers 601, the force in the direction pressing the opposing rollers 601 against the first conveyance guide 135*a* is generated by the driving mechanism for rotationally driving the opposing rollers 601. This makes it possible to surely press the opposing rollers 601 against the first conveyance guide 135*a*.

In the above-described exemplary embodiment, since the four color sensors 200 are provided, the four opposing rollers 601 are arranged to be opposed to the color sensors 200, but the number of color sensors 200 and the number of opposing rollers 601 are not limited thereto. For example, in a case where two color sensors 200 are provided, two opposing rollers 601 are provided to be opposed to the color sensors 200. In this case, effects similar to the above-described effects are also obtainable. In other words, even if the number of opposing rollers 601 is increased or decreased, similar effects are obtainable. Further, in a case where one sponge roller having a wide width is provided to be opposed to the plurality of color sensors 200, similar effects are also obtainable.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-199627, filed Dec. 8, 2021, which is hereby incorporated by reference herein in its entirety.

What is claimed is:

1. An image forming apparatus comprising:

an image forming unit configured to form an image on a sheet;

a first conveyance guide having an opening and forming a conveyance path through which the sheet with the image formed on the sheet by the image forming unit is conveyed;

a second conveyance guide opposed to the first conveyance guide and forming the conveyance path together with the first conveyance guide;

a measurement unit configured to measure, through the opening, a color of the image on the sheet being conveyed through the conveyance path;

an opposing member opposed to the measurement unit at a measurement position of the measurement unit; and a holding member configured to hold the opposing member so that the opposing member is movable between a first position where the opposing member presses the sheet against the opening and a second position where the opposing member is separated from the opening as compared with the first position, wherein the holding member includes an abutment portion configured to abut against the first conveyance guide in a state where the opposing member is at the first position.

2. The image forming apparatus according to claim 1, wherein the opposing member includes a rotatable opposing roller and a rotary shaft supporting the rotatable opposing roller, and wherein in the state where the opposing member is at the first position, a distance between the rotary shaft and the first conveyance guide is determined by the abutment portion abutting against the first conveyance guide.

3. The image forming apparatus according to claim 2, wherein in the state where the opposing member is at the first position, the rotatable opposing roller partially intrudes into the opening.

4. The image forming apparatus according to claim 2, wherein the rotatable opposing roller abuts against the first conveyance guide at the first position.

5. The image forming apparatus according to claim 2, wherein the abutment portion has an abutment surface formed in an arc shape around a rotation center of the rotatable opposing roller as viewed from an axial direction of the rotary shaft, and wherein a distance from the rotation center of the rotatable opposing roller to the abutment surface is less than a radius of the rotatable opposing roller.

6. The image forming apparatus according to claim 2, wherein the rotatable opposing roller is a sponge roller.

7. The image forming apparatus according to claim 1, further comprising a swing shaft configured to swingably support the holding member, wherein the holding member swings around the swing shaft so as to move the opposing member between the first position and the second position.

8. The image forming apparatus according to claim 7, wherein the holding member includes a first holding portion rotatable relative to the swing shaft and a second holding portion fixed to the swing shaft, and wherein the first holding portion includes a regulation portion configured to regulate rotation of the first holding portion.

9. The image forming apparatus according to claim 1, further comprising a swing shaft configured to swingably support the holding member, wherein the opposing member includes a rotatable opposing roller and a rotary shaft supporting the rotatable opposing roller, and wherein the swing shaft is provided on an upstream side of the rotary shaft in a sheet conveyance direction.

10. The image forming apparatus according to claim 1, wherein the abutment portion abuts against the first conveyance guide outside a sheet passing area of the conveyance path, in a width direction orthogonal to a sheet conveyance direction.

11. The image forming apparatus according to claim 1, further comprising an urging member configured to urge the opposing member toward the first conveyance guide.

12. The image forming apparatus according to claim 1, further comprising a rotatably supported cam configured to rotate to move the opposing member to the first position and to the second position.

13. The image forming apparatus according to claim 1, further comprising a control unit configured to adjust an image forming condition of the image forming unit based on a result of the measurement by the measurement unit.

14. A measurement apparatus configured to measure a color of an image formed on a sheet by an image forming unit, the measurement apparatus comprising:

a first conveyance guide having an opening and forming a conveyance path through which the sheet with the image formed on the sheet by the image forming unit is conveyed;

a second conveyance guide opposed to the first conveyance guide and forming the conveyance path together with the first conveyance guide;

a measurement unit configured to measure, through the opening, the color of the image on the sheet being conveyed through the conveyance path;

an opposing member opposed to the measurement unit at a measurement position of the measurement unit; and a holding member configured to hold the opposing member so that the opposing member is movable between a first position where the opposing member presses the sheet against the opening and a second position where the opposing member is separated from the opening as compared with the first position, wherein the holding member includes an abutment portion configured to abut against the first conveyance guide in a state where the opposing member is at the first position.

* * * * *